March 19, 1963   M. L. EDWARDS   3,081,786
MODULATING CONTROLLER FOR A FLOW CONTROL DEVICE
Filed Nov. 5, 1959   6 Sheets-Sheet 1

INVENTOR.
MILES LOWELL EDWARDS
BY
ATTORNEYS

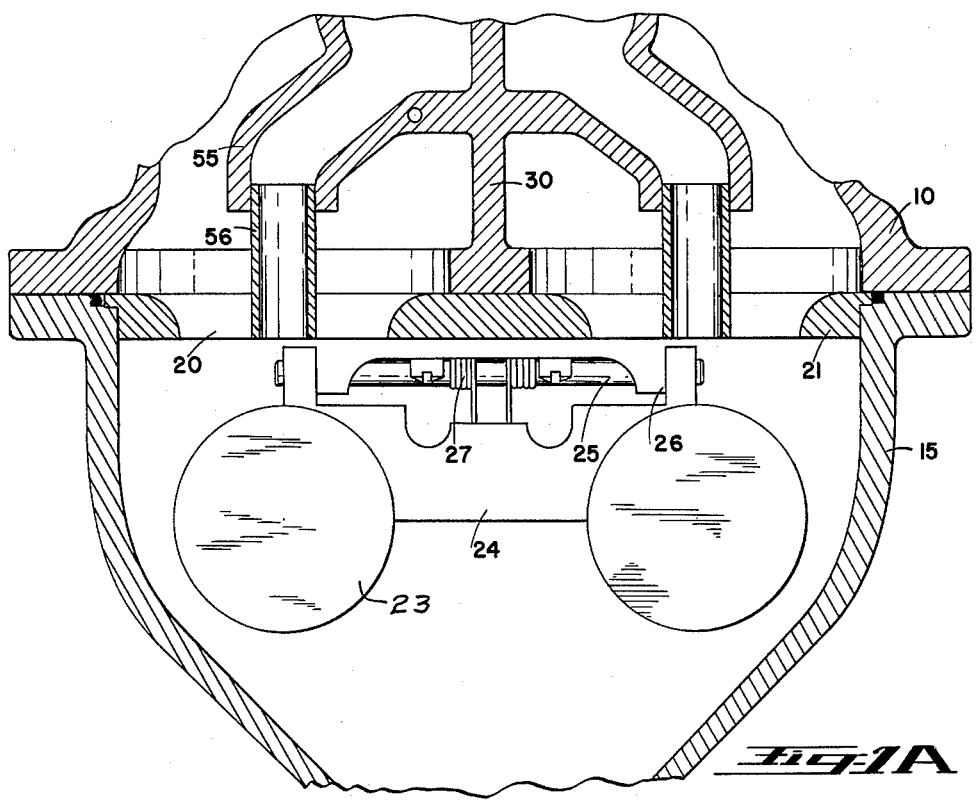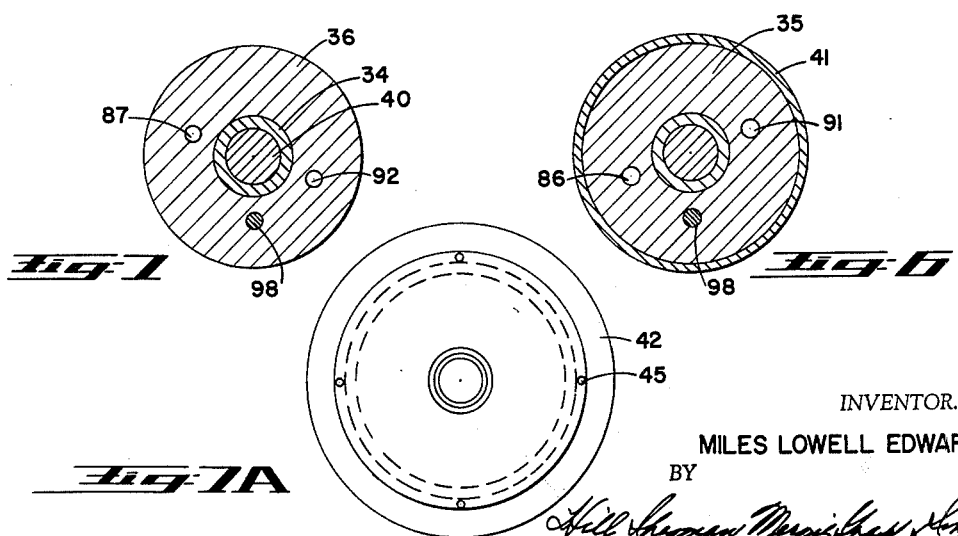

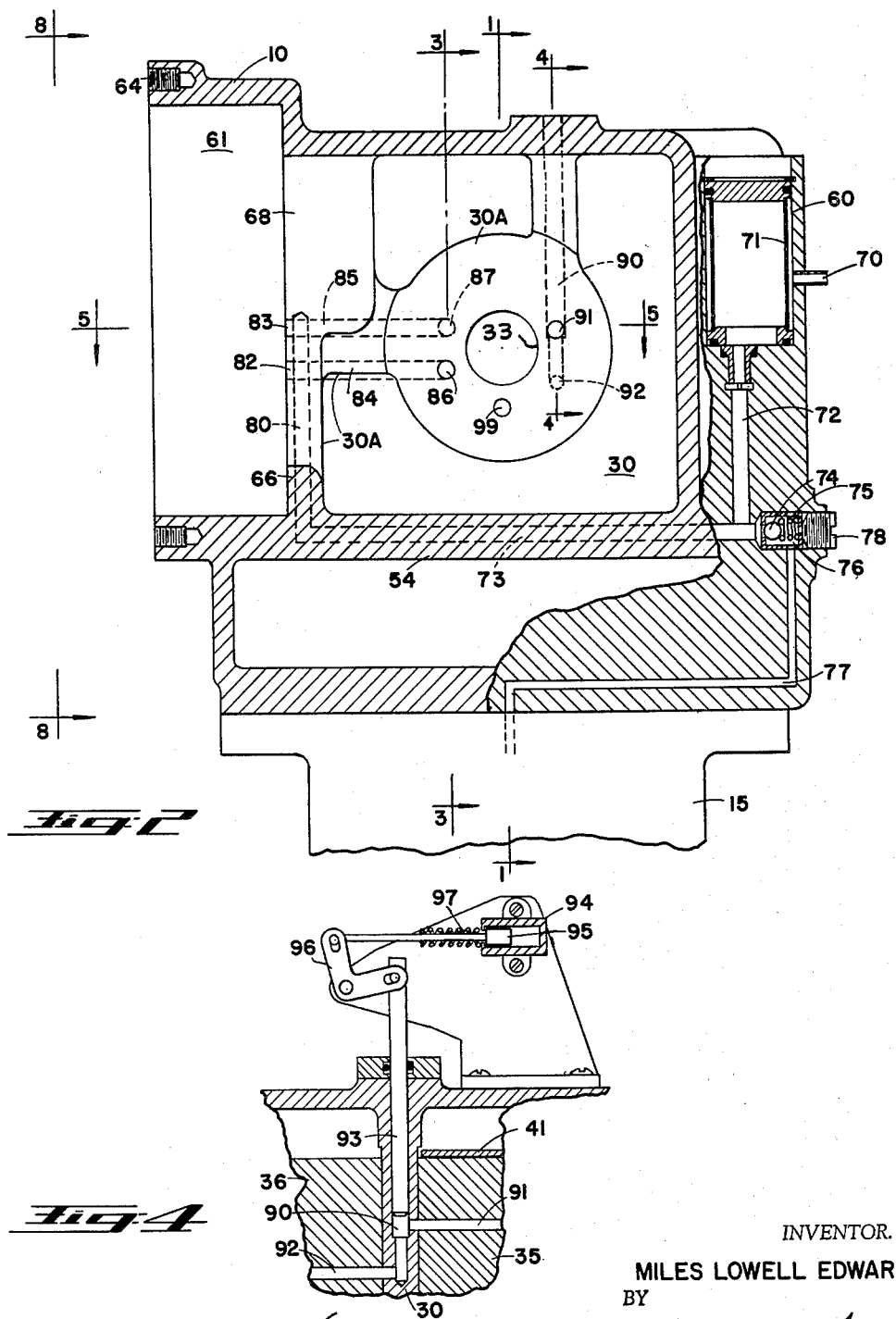

March 19, 1963   M. L. EDWARDS   3,081,786
MODULATING CONTROLLER FOR A FLOW CONTROL DEVICE
Filed Nov. 5, 1959   6 Sheets-Sheet 4
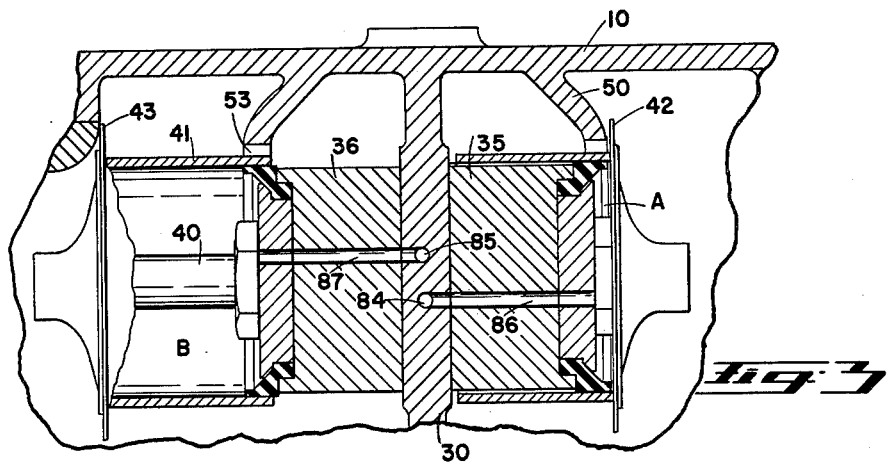
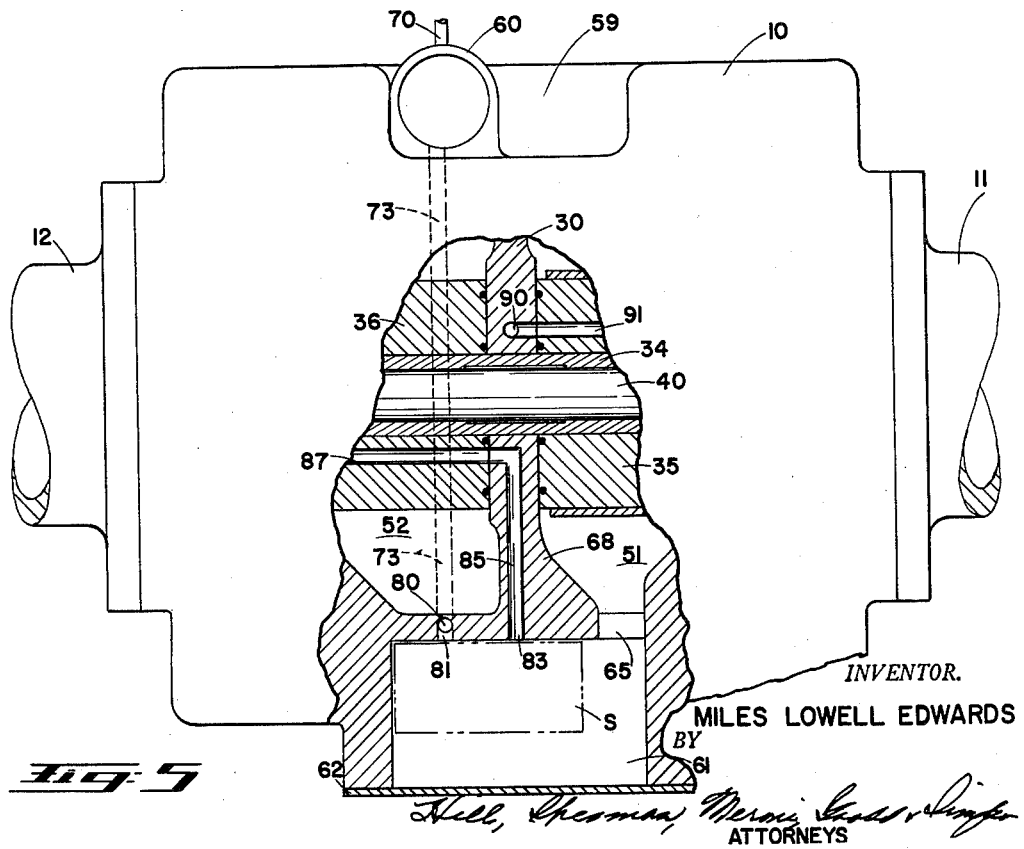
INVENTOR.
MILES LOWELL EDWARDS
BY
ATTORNEYS

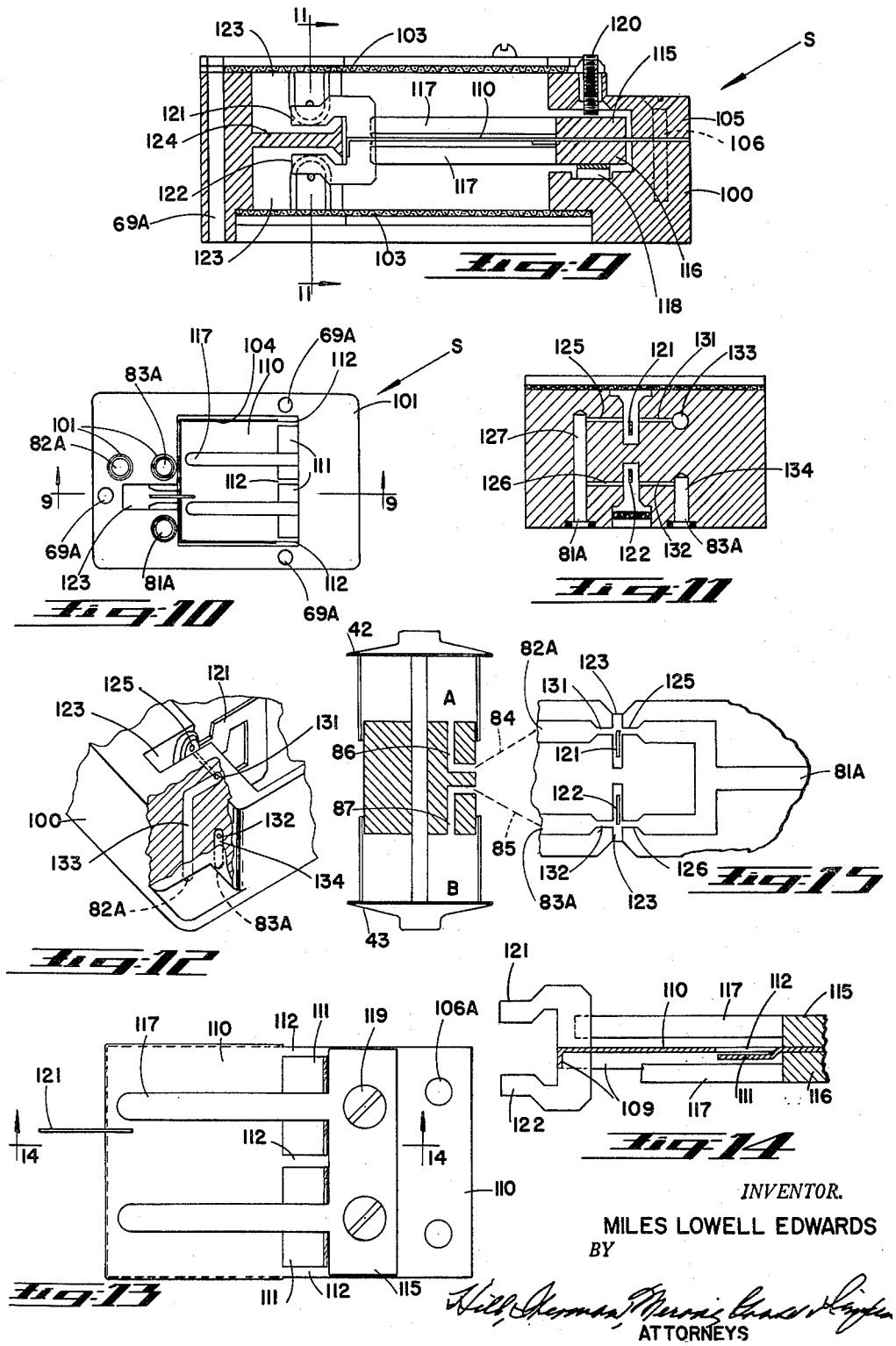
March 19, 1963 M. L. EDWARDS 3,081,786
MODULATING CONTROLLER FOR A FLOW CONTROL DEVICE
Filed Nov. 5, 1959 6 Sheets-Sheet 5
INVENTOR.
MILES LOWELL EDWARDS
BY
ATTORNEYS March 19, 1963     M. L. EDWARDS     3,081,786
MODULATING CONTROLLER FOR A FLOW CONTROL DEVICE
Filed Nov. 5, 1959     6 Sheets-Sheet 6

INVENTOR.
MILES LOWELL EDWARDS
BY
ATTORNEYS

3,081,786
MODULATING CONTROLLER FOR A FLOW
CONTROL DEVICE
Miles Lowell Edwards, 13191 Sandhurst Place,
Santa Ana, Calif.
Filed Nov. 5, 1959, Ser. No. 851,136
4 Claims. (Cl. 137—83)

This invention relates to a device for controlling two or more fluid flows. Such devices are generally used where two fluid flows are to be equalized and mixed together at a point of confluence or where a single flow is to be divided into two separate flows but the invention is not necessarily limited to the division or mixing of flows.

In a single engine aircraft, for example, which burns large amounts of fuel very rapidly, it is desired to draw the fuel equally from wing tanks on opposite sides of the craft in order to keep the fuel load in balance. The present device equalizes the flows from the right and left wing tanks so that both tanks lose weight at the same rate whereby the trim and balance of the craft is not disturbed by the rapid consumption of fuel in flight. However, it will be understood that flows may be devided in other desired fixed ratios. In aircraft use the normal functioning of a flow equalizer may be complicated by the failure of one of the tank booster pumps to maintain its normal output from one of the tanks. Provision must, therefore, be made in case of such emergency to override the normal equalizing function of the device in order to supply an adequate flow of fuel to keep the engine operating satisfactorily, regardless of unbalance.

An important object of the invention is, therefore, to provide a flow equalizer which will satisfy the general requirements stated above in a more efficient and satisfactory manner than flow equalizers heretofore proposed.

Another object is to provide a flow equalizing device which is quickly responsive to variations in the flow rates whereby pulsing or surging is eliminated or minimized and, more particularly, such a device of the relay type actuated by a higher pressure and in which all moving parts affecting response are of light weight and low inertia.

Another object is to provide a flow equalizing device which is more compact and of lighter weight than conventional devices for the purpose whereby a greater flow capacity may be handled in a device of a prescribed size and weight.

Another object is to provide an improved form of mechanical construction in a higher pressure actuated, relay type of flow control device having valve actuating piston means of an improved type and less subject to leakage or drag as a result of manufacturing tolerances than conventional devices for the purpose and, more particularly, such a device employing piston means comprising movable and lighter weight cylinders directly connected to, and closely adjacent to, disk or poppet type valve members.

A further object is to provide an improved higher pressure actuated and relay type of flow control device wherein the flow controlling valves are each actuated by a lightweight motor means, in combination with means to supply actuating fluid to each motor means in response to a dynamic or Venturi type means measuring the difference in the flows and wherein the supply of high pressure actuating fluid to each such motor means is only by jets or streams variably interrupted by swingably moving plates or vanes forming a unitary part of a light and very sensitive, unitary swinging plate member between and actuated by pressures measuring the different flow rates.

Another object is to provide a flow controlling device having a simple bypass system to render the proportioning mechanism ineffective in emergency and which maintains a low pressure drop through the device under bypass conditions.

Another object is to provide a flow controlling device having a sensitive control wherein the fluid displacement in the control movements of the mechanism is minimized because of increased sensitivity in the device and, particularly, such an improved sensitive control in combination with moving valve actuating motors of low weight and inertia and wherein the sensitive control supplies higher pressure fluid to the piston actuating motors in response to actual flow rates together with improved compensating means using static pressures.

Another object is to provide a flow controller having an all metal sensing unit which is of lower weight and inertia, lower drive friction and lower spring biasing and which is also of great durability and long life and has no parts subject to rapid wear by high velocity liquid.

The present flow controller or equalizer is embodied in a housing structure having a pair of aligned oppositely directed inlet connections communicating with a mixing chamber having an outlet connection. The flows through the two inlet connections are equalized by a novel compact reciprocating valve arrangement on the axis of the inlet connections. The valve embodies stationary pistons having a moving dual cylinder assembly equipped at its ends with valve discs movable toward and away from the two inlet openings. When the cylinder assembly moves in one direction, it restricts the flow through one inlet and increases the flow through the opposite inlet and when the cylinder assembly is centered between the two inlets they are opened equal amounts.

The cylinder assembly is moved as described by fluid pressure from an external source derived from the liquid which is being handled. The fluid pressure to the two ends of the cylinder assembly is controlled by a pressure responsive sensing unit measuring and responsive to the different flow rates and not just static pressures by means of Venturi type units and operating in the manner of a flexibly or elastically pivoted swinging plate or moving wall member which is exposed on its opposite sides to the fluid pressures existing in relatively quiescent chambers communicating with the respective inlet chambers. The pressure responsive swinging plate element of the sensing unit directly or unitarily carries vanes which are movable between nozzles and receiving orifices that supply fluid pressure to the opposite ends of the cylinder assembly in accordance with the vane positions. Very minute movements of the vanes are thereby operable to maintain the equalizing valve parts in a position which will equalize the pressures in said two quiescent chambers. Since the pressures in said two quiescent chambers measure the flow rates, the two flows are thereby equalized whereby fluid may be drawn from two different sources at equal rates through a wide range of values of total flow. A novel bypass arrangement permits the entire flow to be drawn through one inlet with minimum pressure drop in case of failure of supply at the other inlet. Also, in case of failure of the electrical system supplying the pumps and other components in the fuel system, the bypass arrangement allows the equalizing valve to float in response to the supply pressures to provide maximum delivery under such emergency condition.

The invention will be better understood and additional objects and advantages will become apparent from the following description of the preferred embodiment illustrated on the accompanying drawings. Various changes may be made, however, in the construction and arrangement of parts and certain features may be used without others, all such modifications within the scope of the appended claims being included in the invention.

In the drawings:

FIGURE 1A is a fragmentary sectional view similar to FIGURE 1 but showing the outlet valves in wide open position;

FIGURE 2 is a sectional view taken on the line 2—2 of FIGURE 1;

FIGURE 3 is a fragmentary sectional view taken on the line 3—3 of FIGURE 2;

FIGURE 4 is a fragmentary sectional view taken on the line 4—4 of FIGURE 2;

FIGURE 5 is a top plan view with certain parts shown in section approximately on the line 5—5 of FIGURE 2;

FIGURE 6 is a sectional view of one of the stationary pistons taken on the line 6—6 of FIGURE 1;

FIGURE 7 is a sectional view of the other piston taken on the line 7—7 of FIGURE 1;

FIGURE 7A is a view of one of the inlet valves taken on the line 7A—7A of FIGURE 1;

FIGURE 9 is a longitudinal sectional view of the pressure sensing unit taken on the line 9—9 of FIGURE 10;

FIGURE 10 is a bottom plan view in reduced scale of the sensing unit;

FIGURE 11 is a cross sectional view taken on the line 11—11 of FIGURE 9;

FIGURE 12 is a fragmentary perspective view of the sensing unit with parts broken away;

FIGURE 13 is an enlarged top plan view of the diaphragm assembly of the sensing unit;

FIGURE 14 is a sectional view on the line 14—14 of FIGURE 13; and

FIGURE 15 is a diagrammatic view illustrating the operation of the sensing unit.

Housing and Valve Structure

Figure 1:
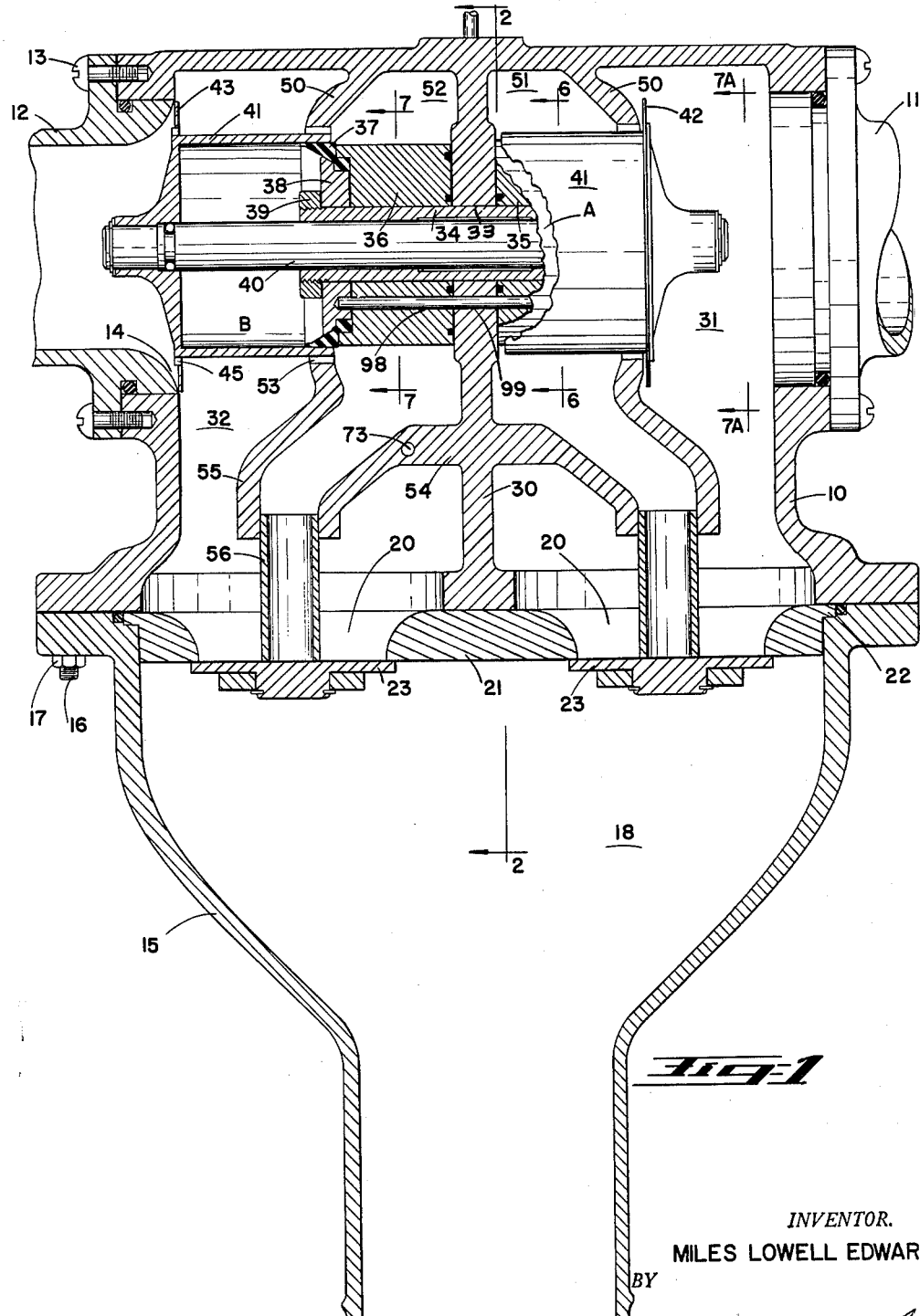
FIGURE 1 is a vertical sectional view of a flow equalizing device embodying the principles of the invention, taken on the line 1—1 of FIGURE 2.

The present device, which is illustrated generally in FIGURE 1, is particularly constructed and arranged to equalize the flows of liquid fuel from two wing tanks on opposite sides of an aircraft having a single engine. A metal housing indicated generally at 10 is thus equipped with a first fuel inlet connection 11 receiving fuel from one of the tanks and a second fuel inlet connection 12 receiving fuel from the other tank. These inlet connections are cylindrical and are flange mounted in axial alignment on opposite sides of housing 10 by means of screws 13. Preferably, the inlet connections have streamlined bell-mouth inner ends 14 which are adapted to serve as valve seats for the equalizing valves. The lower side of the housing 10 in FIGURE 1 is equipped with a tapered flanged discharge connection 15 secured to a bottom flange on housing 10 by stud 16 and nut 17 or other suitable fastening means. Discharge connection 15 defines a mixing chamber 18.

It is understood that the foregoing and other stationary joints presently to be described are sealed with suitable resilient sealing rings or gaskets. The application of such sealing devices is well understood by persons skilled in the art and need not be particularly identified or described in detail. Also, it is to be understood that the equalizing device need not be mounted in an upright position as shown in FIGURE 1, all references to top and bottom, vertical and horizontal sections, and the like, being merely for convenience in reference to the position of the device as shown in FIGURE 1. The device is not affected by the direction of gravity and may be mounted in any convenient position that will satisfy the requirements and limitations of the fuel pumps. The device is also equally operable under gravity head, fuel pumps being mentioned only because they are ordinarily necessary in aircraft to deliver the fuel from the tanks to the engine at the required rate under different conditions and attitudes of flight.

The combined flow enters mixing chamber 18 in discharge connection 15 through a pair of streamlined bell-mouth outlet ports 20 in a port plate 21. For convenience of fabrication and assembly, port plate 21 is made as a separate unit having a marginal flange 22 which is clamped against the under side of housing 10 by a recess in the mounting flange of the discharge connection. Ports 20 are equipped with flap or throttling valves 23 mounted on opposite ends of a plate 24 that is pivotally mounted on a hinge pin 25 carried by lugs or brackets 26 on the under side of port plate 21 as shown in FIGURE 1A. A torsional coil spring 27 has a projecting arm bearing against the center of plate 24 to urge the throttle valves toward closed position as shown in FIGURE 1. FIGURE 1A shows the valves in wide open position for convenience of illustration. When the device is in use the valves are opened varying amounts by the fuel pressure in accordance with the rate of flow of fuel. The purpose of throttle valves 23 is to maintain a slight pressure drop through the housing 10 sufficient to actuate a pressure responsive sensing unit to be described presently. Discharge connection 15 is thus a housing in itself which constitutes a mixing chamber for the two flows of liquid. The lower end of this discharge connection is connected with a suitable conduit, not shown, to the engine fuel pump.

Housing 10, which is preferably an integral casting, contains a plurality of walls, chambers, ports, passageways and associated parts and instrumentalities which cooperate in the functioning of the device. A vertical transverse central wall 30 divides the interior of the housing, forming two inlet chambers 31 and 32 communicating with the inlet connections 11 and 12, respectively. Wall 30 has a circular opening 33 coaxial with inlet connections 11 and 12 containing a cylindrical sleeve 34 on which is mounted a pair of stationary piston elements 35 and 36 on opposite sides of the wall. The outer end of each piston element is equipped with a rubber piston ring 37 which is clamped against the piston by a circular plate 38 under a nut 39 on the threaded end of the sleeve. A cylindrical rod 40 slides in sleeve 34 with a sliding fit that is substantially liquid tight to prevent leakage between the rod and sleeve.

Mounted on the ends of rod 40 are a pair of cup-shaped cylinders 41 which are in sliding engagement with the resilient piston rings 37 to seal the sliding joint and thereby form expansible chamber type, valve actuating motors of the moving cylinder type. The outer ends of cylinders 41 are flanged to form valve discs 42 and 43 which are adapted to engage the valve seats 14. These flanges are perforated with a number of small orifices 45 for a purpose presently to be described. The length of rod 40 is such that when valve 43 is closed as shown in FIGURE 1, valve 42 is wide open and vice versa. These valves are normally operated by unbalancing the fluid pressures of a control fluid in the expansible motor chambers A and B within the cylinders 41 whereby the rod 40 and both cylinders 41 may be caused to reciprocate as a unit.

The valves are also arranged to be operated under certain conditions by the fluid pressures of the main flows in the inlet connections 11 and 12 (instead of by their moving cylinder type motors), it being observed that the valves are of the poppet type facing the inlet flows so that they are movable one way or the other in response to a higher pressure or velocity head in one of the inlet connections when the control fluid is allowed to bypass freely from one cylinder to the other. In normal operation, however, there is no control fluid bypass from one cylinder to the other and the valves 42 and 43 do not respond directly or primarily to fluid pressures acting on the exterior valve faces confronting the inlet connections.

Figure 7B:
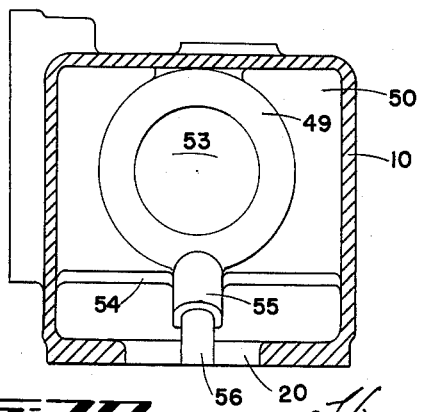
FIGURE 7B is a view in reduced scale on the line 7A—7A of FIGURE 1 with certain parts removed.

On opposite sides of central wall 30 are a pair of vertical transverse walls 50 defining a pair of relatively quiescent pressure chambers 51 and 52 which are more or less isolated from the moving streams of liquid flowing through inlet chambers 31 and 32. Each wall 50 has a conical portion 49 with a circular hole 53 slightly larger than cylinder 41 receiving the cylinder and providing a small annular gap therearound. Chambers 51 and 52 are closed at the bottom by a bottom wall 54. The walls 49, 50 and 54 merge into a depending tubular chamber extension 55 equipped with a vertical tube 56 extending down to the surface of, and substantially abutting, valve 23 when the latter is closed, as shown in FIGURE 1. This wall and tube structure is also shown in FIGURE 7B. As will be apparent to those skilled in this art, the outlet ports 20 provide calibrated discharge orifices to determine the ratio of low rates and these ports 20 are throttled immediately downstream therefrom by the throttling valves 23 with the central tubes 56 forming, with ports 20, Venturi type units to measure the throttled and metered fluid flow rates from the two inlet chambers 31 and 32. It will be seen that the vertical tubes 56 measure the flows through their corresponding ports by the amount of the Venturi-like pressure drop at the lower end of each tube 56, which is shown as being centrally located in the throat of the streamlined converging port at 20. This flow measuring pressure-drop is thus transmitted to each of the quiescent pressure chambers 51 and 52. Each chamber 51 and 52 is but little affected by the relatively small clearance at the circular holes 53 which are only slightly larger than the corresponding cylinder 41. Accordingly, chambers 51 and 52 may be considered as being substantially at Venturi produced pressures resulting from or measuring the flows through the ports 20 from the two inlet chambers 31 and 32.

Figure 8:
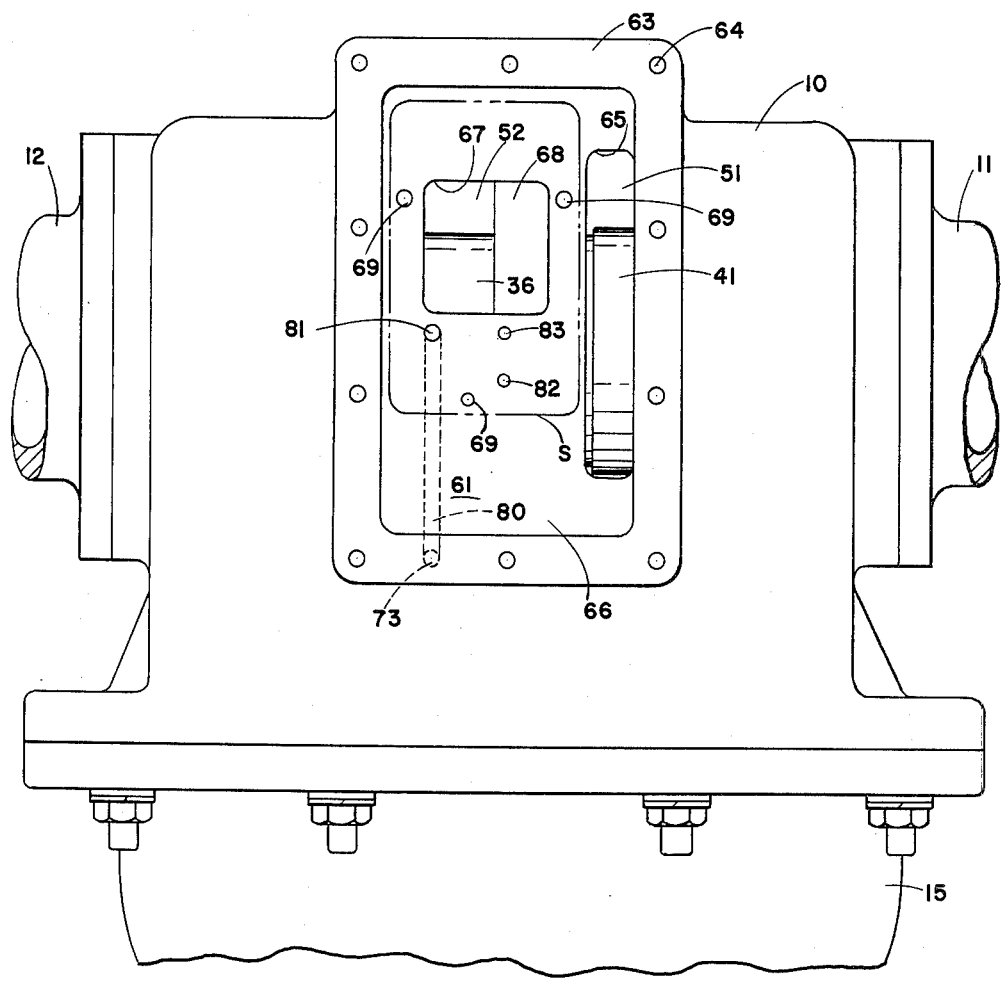
FIGURE 8 is a fragmentary elevation view taken on the line 8—8 of FIGURE 2.

One side of housing 10 is externally recessed as shown at 59 in FIGURE 5 to accommodate a filter chamber 60. The opposite side of the housing is externally recessed to form a sensing unit chamber 61 which is closed by a cover plate 62. The details of this chamber are best shown in FIGURE 8 wherein the cover plate has been removed showing the flange 63 equipped with tapped holes 64 to receive the cover plate screws.

Sensing unit chamber 61 communicates with fluid pressure chamber 51 through an elongated, rectangular port opening 65 through which is visible a portion of the cylinder 41 on the open valve 42 in FIGURE 1. At a distance from the port opening 65 in the inner wall 66 of sensing chamber 61 is a square port opening 67 communicating with pressure chamber 52. A portion of the piston 36 is visible in this port opening. Also visible through port opening 67 is a portion of a slanting wall 68 which connects the center partition wall 30 with the inner wall 66 of chamber 61. Wall portion 68 also appears in FIGURE 2 and a thickened lower portion of this same wall further appears in FIGURE 5. S designates the phantom outline of the sensing unit presently to be described, which has been removed in FIGURES 5 and 8 in order to show the above-described features of housing 10. The numeral 69 designates three tapped screw holes in wall 66 for mounting the sensing unit flat against this wall. When the sensing unit is thus mounted in chamber 61, the side toward the observer in FIGURE 8 is exposed to fluid pressure communicated through port 65 from chamber 51 and the remote side is exposed to fluid pressure communicated through port 67 from chamber 52.

*Fluid Pressure Control System*

Referring now to FIGURE 2, the numeral 70 designates a source of preferably higher fluid pressure connected with filter chamber 60 for operating the inlet valves 42, 43. The fluid used for this purpose is preferably the same liquid comprising the fuel which is admitted through inlet connections 11 and 12 since a small flow of the control fluid is continuously discharged into the main fuel flow. However, the control fluid is preferably obtained from a different point in the fuel system, such as directly from the engine fuel pump which has the advantage of providing control fluid under a higher pressure than that existing in the fuel inlet connections 11 and 12.

Chamber 60 contains a cylindrical screen 71 through which the control fluid passes to a vertical passageway 72 in a wall of housing 10. Vertical passageway 72 connects with a transverse horizontal passageway 73 in wall 54. One end of passageway 73 is closed by a ball relief valve 74 which is seated by a compression spring 75. These parts are contained in a chamber 76 communicating with a relief duct 77 which discharges through an opening in valve plate 21 directly into the mixing chamber in discharge connection 15. The valve parts are retained by a threaded plug 78 whereby the spring pressure on the valve may be adjusted. Relief valve 74 thereby relieves excess pressure through duct 77 to maintain a predetermined fluid pressure in passageway 73 somewhat less than that developed by the engine fuel pump or other source of pressure which supplies inlet connection 70. For example, in a particular installation the spring tension is set to limit the control fuel supply to a pressure in passageway 73 thirty-five pounds per square inch greater than the pressure in the mixing chamber.

The other end of transverse passageway 73 connects with a vertical passageway 80 in wall 66 of sensing unit chamber 61. The upper end of passageway 80 terminates in port 81 in FIGURE 8.

The sensing unit S receives the control fluid through port 81 and operates in a manner presently to be described to direct the control fluid into either one or both of the ports 82 and 83 in FIGURE 8. Ports 82 and 83 communicate with transverse horizontal passageways 84 and 85, respectively, in center wall 30, as shown in FIGURE 2. Transverse passageway 84 connects with a longitudinal passageway 86 which extends continuously through a portion of wall 30, piston 35 and end plate 38 to the chamber A within the right cylinder 41, as shown in FIGURE 3. Similarly, transverse passageway 85 connects with a longitudinal passageway 87 extending in the opposite direction through a portion of wall 30, piston 36 and end plate 38 into the chamber B within the left cylinder 41.

Thus, when the sensing unit establishes a higher control fluid pressure in port 83 than in port 82 in FIGURE 8, the valve 43 is moved toward its closed position, as shown in FIGURES 1 and 3, and the valve 42 is opened. When the sensing unit establishes a higher fluid pressure in port 82 than in port 83, the pressure in right cylinder chamber A exceeds the pressure in left cylinder B, causing valve 42 to move toward closed position and valve 43 to open. When equal fluid pressures are introduced into ports 82 and 83, the internal pressures are balanced in both cylinder chambers A and B and both valves remain stationary in their last adjusted position. When fluid is introduced into one of the cylinders 41 producing cylinder and valve movement, the contraction in volume within the other cylinder discharges fluid through the passageways just described back into the sensing unit from whence such fluid escapes to the main flow of fuel through ports 65 and 67 in FIGURE 8. The control fluid passageways just described are relatively small and normally the valve and cylinder movements are also small, whereby the present control system operates with an insignificant amount of fuel diverted from the engine fuel pump which supplies the inlet 70 to the filter chamber.

FIGURES 2 and 4 illustrate a control fluid bypass to permit the valves 42 and 43 to move freely under certain conditions. The central wall 30 contains a vertical bore 90 communicating at an upper level with a longitudinal passageway 91 extending through piston 35 and communicating with the chamber A within the right cylinder 41. Bore 90 communicates at a lower level with a longitudinal passageway 92 extending in the opposite direction through piston 36 to the chamber B within left cylinder 41. When these passageways 91 and 92 are in communication with each other as shown in FIGURE 4, the fluid may pass freely back and forth from one cylinder chamber to the other, allowing free movements of the cylinders and valves 42, 43.

The intercommunication between passageways 91 and 92 is normally blocked, however, by a plunger rod 93 which is normally depressed in the bore 90 to close the end of passageway 91. In normal operation of the fuel system, plunger 93 is held in depressed position by the energization of a solenoid coil 94 which exerts a continuous magnetic pull on a slidable armature 95 connected with a bell crank lever 96. The pull of the solenoid is superior to the counter force exerted by a spring 97. Upon failure of the electrical power system which operates the booster pump in the fuel tanks, solenoid 94 is deenergized and spring 97 raises the plunger to the position shown. Preferably, the solenoid may also be deenergized by a manual switch and by a pressure sensitive switch responsive to mixing chamber pressure, not shown. The electrical circuit arrangements to produce these functions are fully understood by persons skilled in the art and need not be illustrated in connection with the present invention. Plunger rod 93 and solenoid 94 are omitted in FIGURE 2.

The various longitudinal passageways in cylinders 35 and 36 are maintained in proper register with the communicating passageways in central wall 30 and end plates 38 by a locating pin 98 which is positioned by an opening 99 in the wall 30 and extends through both cylinders and into their end plates 38, as shown in FIGURE 1. Numeral 30a designates thickened portions of central wall 30 containing the various passageways mentioned.

Pressure Sensing Unit

FIGURES 9–15 illustrate the details of construction and operation of the pressure sensing unit S which is mounted in chamber 61 as described in connection with FIGURES 5 and 8.

The operative parts of the sensing unit are carried by a rectangular open center metal frame or casing member 100. The top and bottom sides of the frame are equipped with removable protective metal screens 103 which guard and prevent tampering with the sensitive mechanism disposed within the central opening 104. Marginal portions of the frame are provided with three smooth screw holes 69a which register with the three tapped screw holes 69 in FIGURE 8 to receive screws for mounting the sensing unit in the position indicated by the phantom outline S in FIGURE 8. The frame 100 also contains three ports 81a, 82a and 83a which register with the three ports 81, 82 and 83, respectively, in FIGURE 8. The ports 81a, 82a and 83a are surrounded by annular grooves 101 containing resilient rubber sealing rings to maintain fluid communication between these registering ports without permitting leakage from one port to another or into the chamber 61. The frame opening 104 registers with port opening 67 in FIGURE 8.

One end of frame 100 is equipped with a clamping plate 105 which is secured to the frame by screws 106. One end of a metal cantilever diaphragm 110 or more accurately, a springy swinging plate is clamped against an end of the frame by clamping plate 105. Plate 110 is a flat sheet of thin spring metal having a rectangular outline of such dimensions that it will clear the sides and opposite end of opening 104 for free movement within the opening while at the same time substantially filling and blocking the opening to function generally like a diaphragm or a piston except that there is not the rubbing friction and weight of a piston nor is there the lower effective area, the higher weight and inertia nor the necessity for springy bending all around its periphery of a diaphragm. The side and free end portions of member 110 are preferably provided with downturned stiffening flanges 109 as shown in FIGURE 14.

In order to make this swinging plate member freely responsive to slight differences in fluid pressure on opposite sides thereof, a pair of broad tongues 111 are cut at the clamped end of the plate 110 so that movement of the main body of the plate is accomplished by bending of the three relatively narrow arms 112 which connect the main body of one end supported, swinging plate type member 110 with the end portion that is clamped under block 105. Thus, the stiff main body of the diaphragm is adapted to bend as a tongue with substantially all of the bending occurring in the three narrow strips 112 at the edge of its cantilever support. The tongues 111 are preferably bent and offset very slightly out of the plane of the main body of this plate 110, as shown in FIGURE 14, so as to avoid contact therewith which would impede flexing of the arms 112. The slight offset of tongues 111 does not create openings that will permit an appreciable fluid flow through this plate 110.

A pair of bars 115, 116 are clamped on opposite sides of the diaphragm-plate 110 adjacent its supported end between the clamp bar 105 and the base of tongues 111. Each of these bars is equipped with a pair of rigid stop fingers 117 extending along the plate 110 in spaced relation thereto to prevent excessive flexure of its flexibly bendable hinge portion beyond its elastic limit. The plate 110 is urged upward as viewed in FIGURE 9 by a bowed leaf spring member 118 which bears against the under side of bar 116. An adjusting screw 120 in the frame bears against the upper side of bar 115 to press the plate 110 downward against the force of spring 118. During such adjustment, the plate bends between the bars 115, 116 and the clamp block 105 whereas the normal flexing movement in operation occurs in the narrow connecting arms 112, the spring 118 being sufficiently strong to hold the bar 115 against adjusting screw 120 under the differential fluid pressure conditions encountered in use.

FIGURE 13 shows the plate 110 assembly removed from frame 100. Screws 119 clamp the bars 115, 116 to the plate and holes 106a receive the screws 106.

The free end of the plate 110 is equipped with a pair of thin, relatively rigid blocking vanes for jet interrupting plates 121 and 122 which are perpendicular to the plane of the plate 110 and project beyond the end thereof as shown in FIGURES 9 and 14. The vanes 121 and 122 are adapted to move in slots 123 in the frame 100 above and below bridge or partition wall 124. One side wall of the upper slot 123 is provided with a nozzle orifice 125 and the corresponding wall of the lower slot is provided with a nozzle orifice 126. These nozzles are supplied with control fluid under pressure from a common passageway 127 communicating with the port 81a as shown in FIGURE 11. The opposite side wall of the upper slot is provided with a receiving orifice 131 and the opposite side wall of the lower slot is provided with a receiving orifice 132. Orifice 131 is connected with an L-shaped passageway 133 communicating with the port 82a and the orifice 132 connects with a short passageway 134 communicating with port 83a as shown in FIGURE 12.

The nozzle and receiving orifices are spaced apart only a sufficient distance to permit the free movement of vanes 121 and 122 therebetween without rubbing contact. The vanes are sufficiently stiff that they are not deflected by jets of fluid from the nozzles. Receiving orifice 131 is aligned with nozzle orifice 125 and receiving orifice 132 is aligned with nozzle orifice 126. The distance between the outer edges of the two vanes 121 and 122 is preferably equal to the distance between the centers of the nozzle orifices 125, 126 which is the same as the distance between the centers of receiving orifices 131 and 132.

The swinging plate 110 is adjusted by means of screw 120 to a central position as shown in FIGURES 9, 11 and 15 such that the outer edges of the vanes 121 and 122 will intercept or block approximately half the cross sectional areas of the jets from the respective nozzles. When this occurs, equal pressures are developed in receiving orifices 131 and 132, which pressures are communicated by the passageways hereinabove described to the two cylinders 41 so that no movement of valves 42, 43 occurs.

When the plate 110 is exposed to a higher pressure on one side than on the other, the resultant deflection of the plate will either partially or completely block or intercept one of the jets to prevent it from establishing a fluid pressure in its receiving orifice while the jet from the other nozzle will flow with less or no obstruction into its receiving orifice as will be apparent from reference to FIGURES 9, 11 and 15. This will produce a higher pressure in one of the cylinders 41, causing movement of the valves 42, 43 until the pressures are equalized in chambers 51, 52. Equalization of the pressures in these chambers produces equal rates of flow through the two inlet connections 11 and 12 which is the objective to be accomplished. The vane movement is proportional to the pressure differential acting on the swinging plate 110. In this way an extremely sensitive pressure responsive sensing unit is provided which is substantially free of friction and wear.

It is not necessary to seal the periphery of swinging plate 110 in its frame 100. When a pressure differential exists on opposite sides of the swinging plate, the leakage crevice around the edges of the plate through opening 104 is insignificant in relation to the size of port openings 65 and 67, tubes 56, and the rates of flow of the main streams communicating with the ends of tubes 56, whereby such leakage does not impair the sensitivity of the pressure response. The present form of this swingable flexibly hinged plate 110 which may be termed a cantilever diaphragm which permits an indefinitely durable all-metal construction which at the same time is functionally superior to a conventional sealed type of diaphragm made of any available materials.

*Operation*

It has previously been explained that the plate 110 of the pressure sensing unit S is exposed on one side to the fluid pressure existing in chamber 51 in FIGURE 1 and exposed on the other side to the fluid pressure existing in chamber 52, the former pressure being communicated through port opening 65 in FIGURE 8 to that side of the plate which would face the observer in FIGURE 8 and the latter pressure being communicated through port opening 67 to the remote side of the plate 110.

Under high flow condition, when fuel is flowing through the device at a high volumetric rate, the outlet valves 23 will be held quite wide open, as represented by the extreme open position shown in FIGURE 1A. At such time and for all higher values of total flow, the fluid pressures existing in chambers 51, 52 as a result of the velocities for the fluid flow rates therethrough are satisfactorily determined primarily by the pressure existing at the open lower ends of tubes 56, which end in and at the throats of the tapered inlet, calibrated discharge ports 20 to form venturi means measuring the flow rates through these two ports 20. The annular openings at 53 around the cylinders 41 then having an insignificant effect regardless of the positions of valves 42, 43.

Under the condition of low rate of total flow, however, when the outlet valves 23 are opened only a slight amount against their common spring 27 by the pressure differential across these two throttle valves, it is found that the pressure response through tubes 56 does not produce a pressure differential in chambers 51, 52 which is proportional to the two rates of flow through inlet connections 11 and 12 at times when one of the inlet valves 42, 43 approaches the closed position as exemplified by the valve 43 in FIGURE 1. In such position of the valve 43 the orifices 45 direct jets of fuel through the annular opening at 53 directly into the chamber 52 to supplement and correct the inadequate pressure response communicated from tube 56. The necessary compensation can thereby be obtained by proper choice of the size and number of the orifices 45 and the size of the opening 53.

Under normal operating conditions, the booster pumps supplying inlet connections 11 and 12 produce approximately equal pressures and rates of flow, but it will be apparent that after a period of time even a relatively small difference in the booster pump outputs would reduce the weight of one wing tank faster than the other with considerable unbalance in the trim of the aircraft where large amounts of fuel are involved. The unbalance is, of course, aggravated if one of the booster pumps is not developing its normal rated output.

For example, let it be assumed that the booster pump supplying inlet connection 12 develops a higher pressure and produces a higher rate of flow than the pump supplying inlet connection 11. The pressure in inlet chamber 32 will then be higher than the pressure existing in inlet chamber 31, these pressures being communicated through tubes 56 to the chambers 52 and 51, respectively. The higher pressure in chamber 52 is communicated through port opening 67 in FIGURE 8 to the back side of plate 110, which is the under side in FIGURE 9, deflecting the plate in an upward direction as it is viewed in this figure. Such movement of the plate causes vane 121 to intercept the jet from nozzle orifice 125 to a greater extent and deflect it away from receiving orifice 131 while vane 122 moves clear, or substantially clear, of the jet from nozzle orifice 126. The latter jet thus flows into receiving orifice 132 to increase the fluid pressure in passageway 134 in FIGURE 11 and passageway 85 in FIGURE 2 leading to passageway 87 in FIGURE 3 which communicates with the cylinder chamber B in FIGURES 3 and 1.

As long as plate 110 remains deflected as just described, fluid from nozzle orifice 126 flows through the passageways mentioned to increase the volume of cylinder chamber B and move valve 43 to toward its seat 14. At some point during the closing movement of valve 43, during which movement valve 42 is opened an equal amount, the two flows through inlet connections 11 and 12 become equalized and eliminate the pressure differential which had existed between chambers 51 and 52. Then, with equal pressures on opposite sides of plate 110, the vanes 121 and 122 return to their central positions shown in FIGURE 9, re-establishing equal pressures in the two receiving orifices 131 and 132 to stop the flows of control fluid therethrough and stop the movement of cylinders 41 and inlet valves 42, 43.

Since the control fluid is under considerably higher pressure than the main inlet flows, the expanding cylinder 41 is capable of moving its valve disc against the force of the inlet flow even though one inlet flow may be considerably stronger than the other. Thus, a moving force of considerable magnitude in cylinder chambers A and B is controlled by a pressure differential in chambers 51 and 52 of very small magnitude to give a pronounced relay action. This permits the use of a light spring force on flap valves 23 creating a relatively small pressure drop in the device, which is desirable.

As fluid is added to expand the cylinder chamber B, as just described, cylinder chamber A contracts, expelling liquid through passageway 86 in FIGURE 3, passageway 84 in FIGURE 2, and passageway 133 and orifice 131 in FIGURES 11 and 12 to discharge such liquid into the upper vane slot 123.

When the pressure differential between chambers 51 and 52 is reversed, it is apparent that plate 110 moves in the opposite direction to reverse the flows of control fluid through the above enumerated passages and produce movements of the valves 42 and 43 in the opposite direction until equal pressures are re-established on opposite sides of plate 110. The rates of flow through inlet connections 11 and 12 are thereby equalized so that the left and right wing tanks will lose weight at equal rates and maintain the lateral trim of the aircraft.

The nozzle and receiving orifices 125, 126, 131 and 132 are relatively minute in cross sectional area whereby correspondingly minute movements of vanes 121 and 122 produce maximum control effects. Hence, plate 110 is extremely sensitive to very small pressure differentials to amplify the control effects and further reduce the pressure drop which must be imposed on the fuel through the closing force applied to outlet valves 23 by spring 27. The present equalizing device is thereby adaptable to conventional fuel systems without any change or modification of existing booster pumps or other components of the fuel system.

The invention is not limited to aircraft use as above described but may be applied in an obvious manner to any system where two fluid flows are to be equalized.

Having now described my invention and in what manner the same may be used, what I claim as new and desire to protect by Letters Patent is:

1. A differential pressure sensing device comprising a casing having an opening therein, a swingable plate means mounted in said opening for exposure on its opposite sides to two different sources of fluid pressure, said plate having an end portion mounted in said frame at one marginal side of said opening, a tongue cut in said plate adjacent the mounted end thereof so that the main portion of said plate in said opening is connected with said mounted end of the plate by a plurality of relatively narrow strips of material which are subject to bending upon movement of the plate as a flexibly supported rigid cantilever unit, the remaining edge portions of the plate except for said mounted end portion having working clearance within said opening, means defining a receiving orifice in said casing on the opposite side of said opening, a nozzle in said frame directed toward said receiving orifice, and a vane on said plate movable transversely between said nozzle and receiving orifice in response to fluid pressure differential on opposite sides of the plate.

2. A differential pressure sensing device for the relay type control of a fluid pressure motor comprising a body member having an opening therein, a swingable plate member across said opening and cantilever mounted on one side thereof in said opening for flexibly hinged swinging movements in said opening in response to pressure differences across the two faces of said plate member, means defining a receiving orifice closely adjacent said opening, a jet nozzle directed towards and closely spaced from said orifice and a vane means unitary with and directly on said plate member movable thereby between said nozzle and said orifice to control flow therebetween.

3. A differential pressure sensing device comprising a body having an opening therein, said body having connections for two different sources of fluid pressure, a movable wall mounted across said opening between said two different sources of fluid pressure, a receiving orifice in said body, a nozzle in said body directed toward said receiving orifice, a vane means carried and movable by said movable wall between said nozzle and its receiving orifice, said vane means being spaced from said nozzle and from said receiving orifice to avoid rubbing frictional contact during movements of said vane means.

4. A pressure sensing unit comprising a casing having an opening therethrough, said casing having passage means to be connected to two different sources of fluid pressure, a cantilever mounted swingable plate flexibly hinged in said opening, said plate having working clearance within said opening except at its flexibly hinged side, a pair of receiving orifices in said casing adjacent to said plate, a pair of nozzles in said casing directed toward said receiving orifices and vane means on the free end of said plate movable transversely between said nozzles and their said receiving orifices.

References Cited in the file of this patent
UNITED STATES PATENTS

| | | |
|---|---|---|
| 1,745,256 | Grable | Jan. 28, 1930 |
| 2,058,309 | Haering | Oct. 20, 1936 |
| 2,386,291 | Browne | Oct. 9, 1945 |
| 2,763,279 | Godden | Sept. 18, 1956 |
| 2,802,484 | Sheets | Aug. 13, 1957 |
| 2,839,080 | Copeland | June 17, 1958 |
| 2,844,159 | Trethewey | July 22, 1958 |
| 2,907,348 | Gerteis | Oct. 6, 1959 |
| 2,911,005 | Adelson | Nov. 3, 1959 |
| 2,952,265 | Isaacson | Sept. 13, 1960 |
| 2,974,674 | Baldridge | Mar. 14, 1961 |
| 2,986,152 | Bayer | May 30, 1961 |
| 3,013,432 | O'Keefe | Dec. 19, 1961 |